United States Patent [19]

Van de Steeg et al.

[11] Patent Number: 5,835,781
[45] Date of Patent: Nov. 10, 1998

[54] BREAK-AWAY KEY FOR ELECTRONIC CIRCUITRY

[75] Inventors: Kerry Van de Steeg, Chagrin Falls; Gerald S. Pepera; Gene S. Laurich, both of Mentor; James E. Schey, Chagrin Falls, all of Ohio

[73] Assignee: Allen Bradley Company, LLC, Milwaukee, Wis.

[21] Appl. No.: 376,540

[22] Filed: Jan. 20, 1995

Related U.S. Application Data

[63] Continuation of Ser. No. 947,323, Sep. 18, 1992, abandoned.

[51] Int. Cl.$^6$ .................................................. G06F 15/00
[52] U.S. Cl. .......................... 395/800.01; 200/61.08; 361/792
[58] Field of Search ..................... 395/800, 800.01; 200/61.08; 439/67; 361/406, 792

[56] References Cited

U.S. PATENT DOCUMENTS

| | | | |
|---|---|---|---|
| 3,594,684 | 7/1971 | Miller | 339/17 LM |
| 4,216,523 | 8/1980 | Harford | 361/393 |
| 4,670,749 | 6/1987 | Freeman | 340/825.85 |
| 4,985,808 | 1/1991 | Zernov | 361/406 |
| 5,023,726 | 6/1991 | Campisi | 358/254 |
| 5,044,964 | 9/1991 | Minerd et al. | 439/67 |
| 5,049,728 | 9/1991 | Rovin | 235/492 |
| 5,280,413 | 1/1994 | Pai | 361/792 |
| 5,359,168 | 10/1994 | Cunningham | 200/61.08 |
| 5,369,219 | 11/1994 | Kerns | 174/250 |

FOREIGN PATENT DOCUMENTS 2160366   12/1985   United Kingdom .

*Primary Examiner*—Alyssa H. Bowler
*Assistant Examiner*—Walter D. Davis, Jr.
*Attorney, Agent, or Firm*—Joseph N. Ziebert; John M. Miller; John J. Horn

[57] ABSTRACT

A structural key is checked under program control to control the mode of operation for a processor-based electronic circuit board. A break-away key portion of the circuit board is connected to the main portion along a boundary of frangible links with circuit paths traversing the boundary and carrying logic signals. The presence or absence of the break-away portion is sensed by sensing the bit pattern at an I/O address. If the absence of the break-away portion is sensed, the function of a user-commanded motion block is tested and processor operation is limited to executing functions for the mode corresponding to the absence of the break-away portion.

1 Claim, 5 Drawing Sheets

BREAK-AWAY KEY FOR ELECTRONIC CIRCUITRY

This is a continuation, of application Ser. No. 07/947,323 filed Sep. 18, 1992, now abandoned.

BACKGROUND OF THE INVENTION

1. Field of the Invention

The invention relates generally to electronic circuitry of the type mounted on circuit boards and more particularly to apparatus for selecting one of several available modes of operation for such circuitry.

2. Description of the Background Art

Circuit boards have been manufactured with break-away portions. Campisi, No. 5,023,726 shows circuit boards being broken apart during the manufacturing of circuitry for a TV set. In a similar vein, UK Patent Application GB 2 160 366A shows a break-out portion which becomes a separate small circuit board connected by a ribbon connector to a main circuit board.

Circuit boards have included portions which could be removed to change the connections and certain functions on a circuit board. Harford, U.S. Pat. No. 4,216,523 describes a portion of a circuit that can be removed when circuitry is defective. Zernov, U.S. Pat. No. 4,985,808, shows a break-away tab for selecting a different impedance. Rovin, No. 5,049,728, shows parts which are removed to change the interconnection of circuit paths on a circuit board.

Freeman, No. 4,670,749, shows that the state of certain switching elements can be controlled by data in a memory to connect certain conductors in a circuit board. Freeman does not place the memory or the switching elements on a break-away section of the board.

In certain instances, it may be desirable to provide a microprocessor-based electronic circuit with one set of functions for one type of end user and another set of functions for another type of end user. The manufacturer may desire to control the function of the circuit board while limiting the end user's control over changes in the function of the circuit board. In such situations, it also important that the manufacturer's intent not be defeated or reversed.

SUMMARY OF THE INVENTION

The invention is incorporated in an electronic circuit board with a break-away portion and a processor which is programmed to recognize whether the break-away portion is present or broken away. The break-away portion has a physical and electrical arrangement which secures the electronic circuit board against tampering to defeat the break-away operation. The break-away portion with its electrical arrangement functions as a tamper-resistant key.

More specifically, the invention is embodied in an electronic module including a circuit board with a main portion, including a microelectronic processor on the main portion. A break-away portion carries one or more identification signals in a predetermined logic state and the main portion has a corresponding status register which is addressable by the microelectronic processor.

The microelectronic processor executes instructions for carrying out user-programmed functions. The microelectronic processor executes further instructions to address the break-away portion to read the one or more predetermined identification signals. The microelectronic processor executes further instructions that are responsive to the absence of the one or more identification signals in the predetermined logic state for limiting execution of instructions for carrying out user-programmed functions.

The circuit is designed to prevent tampering by imbedding the circuit paths which carry the identification signals in a multi-layered circuit board. The signals traverse a boundary of frangible links at a plurality of different levels and may be interconnected between levels or dead-ended on the break-away portion. The break-away portion is covered by foil masks on the top and bottom to prevent observation of the circuit patterns on the break-away portion. The break-away portion forms a key to the operation of the circuit. If it is present, the circuit will operate in one mode; if it is absent, the circuit will operate in another mode.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

DETAILED DESCRIPTION OF THE PREFERRED EMBODIMENT

Figure 1:
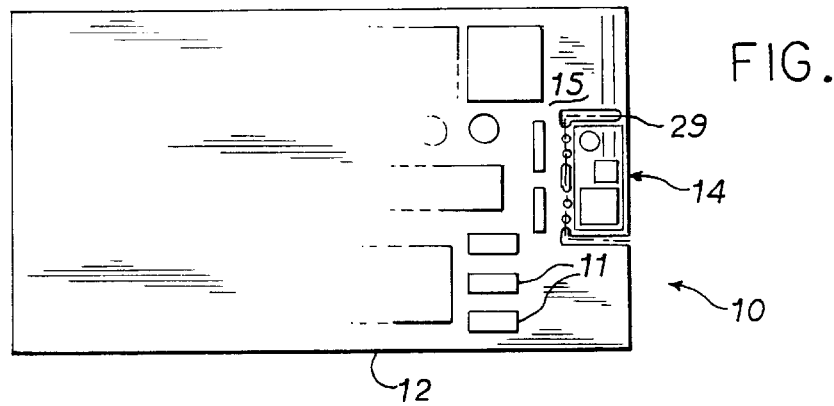
FIGS. 1 and 1a are plan views of a circuit board and break-away portion of the present invention.
Figure 1A:
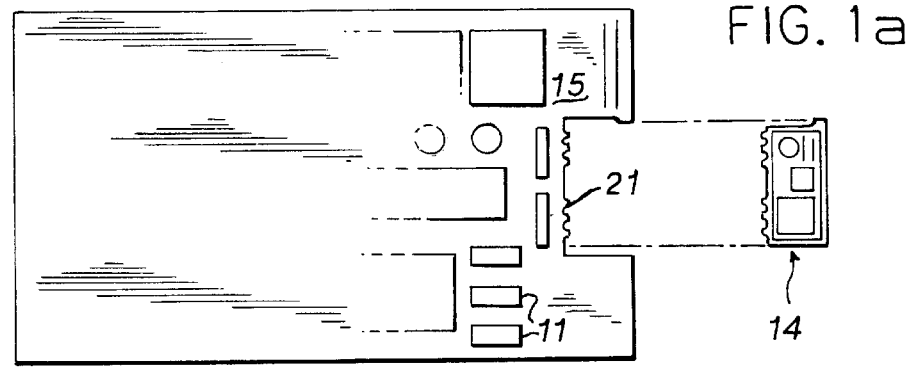
Figure 3A:
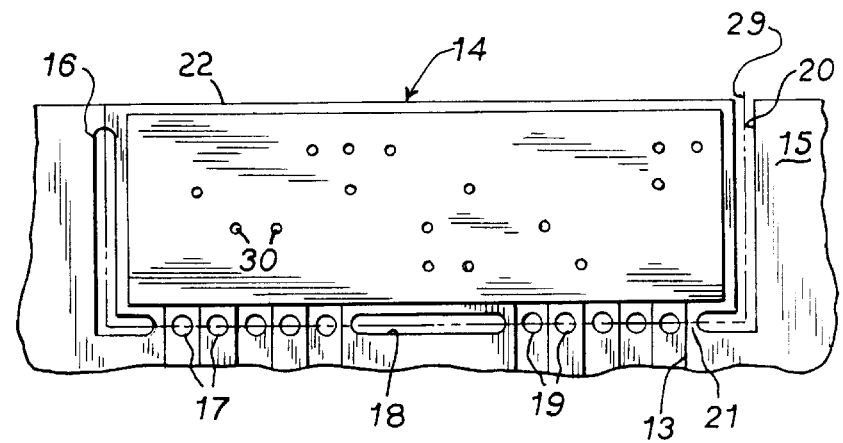
FIG. 3a–3g are a series of plan views of the layers of the break-away portion seen in FIG. 2.
Figure 3B:
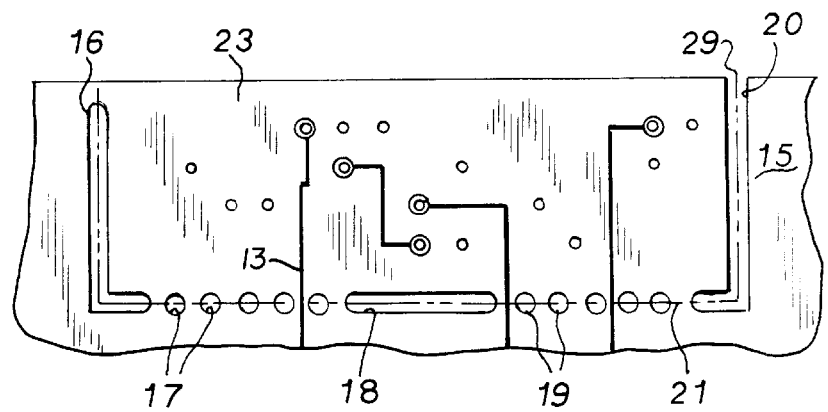
Figure 2:
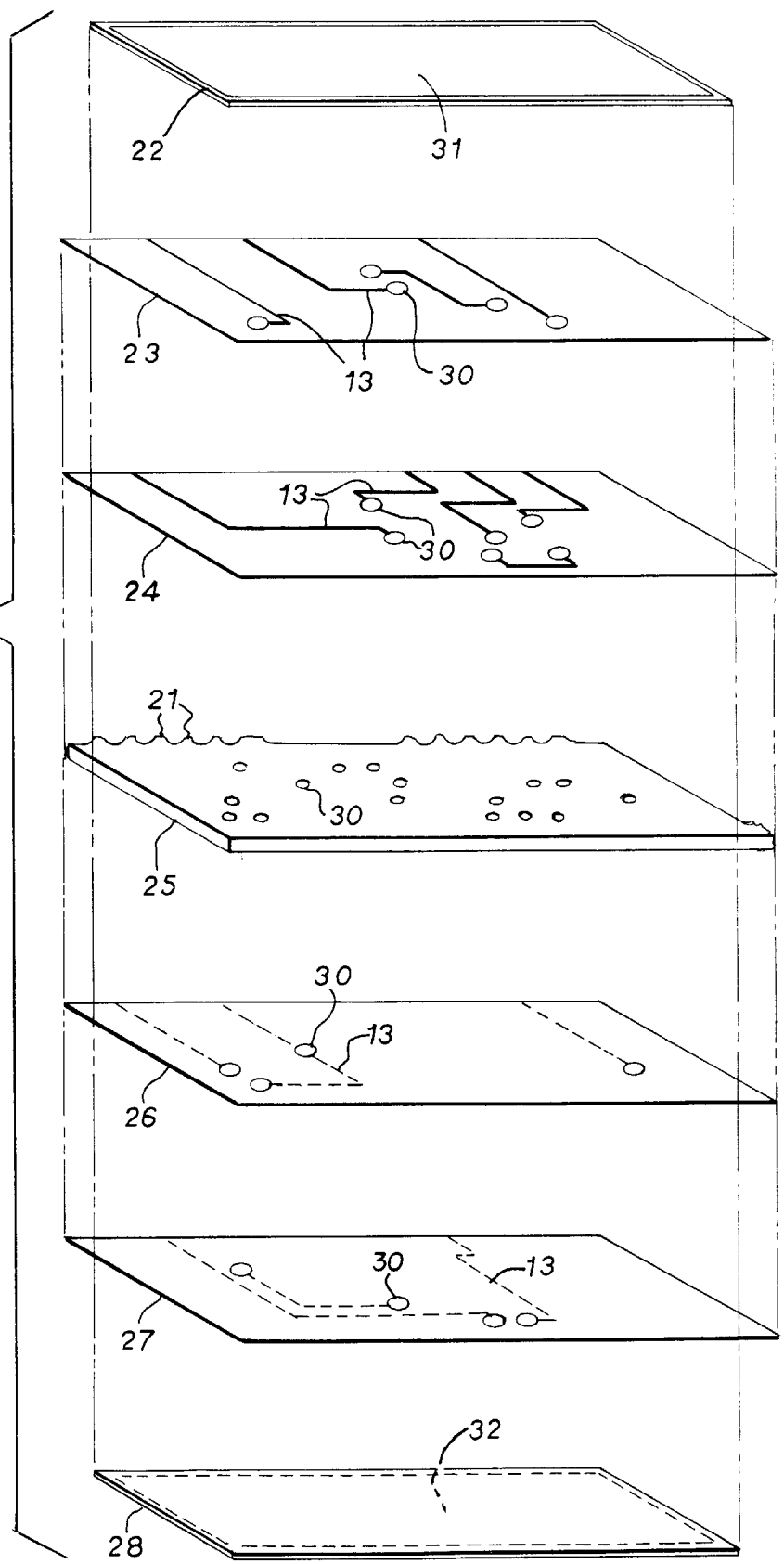
FIG. 2 is an exploded view in perspective of the break-away portion of the circuit board of FIG. 1.
Figure 3C:
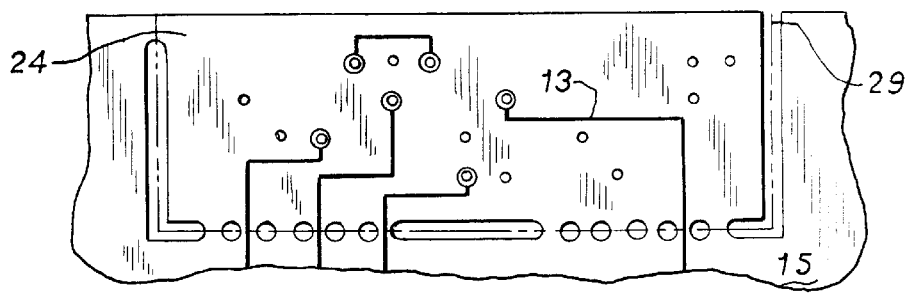
Figure 3D:
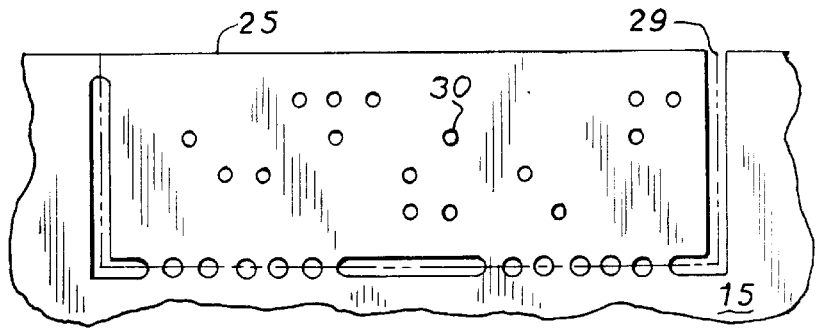
Figure 3E:
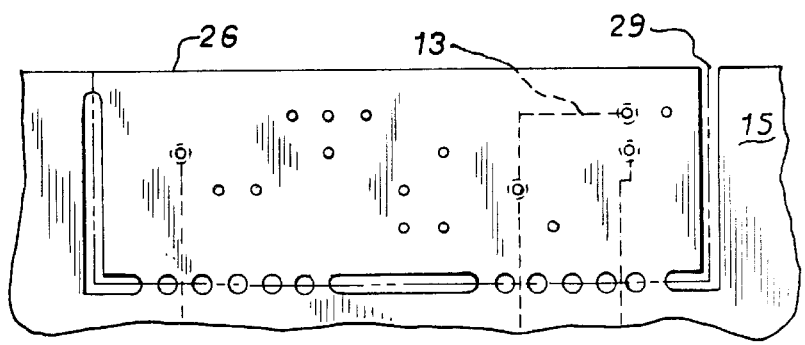
Figure 3F:
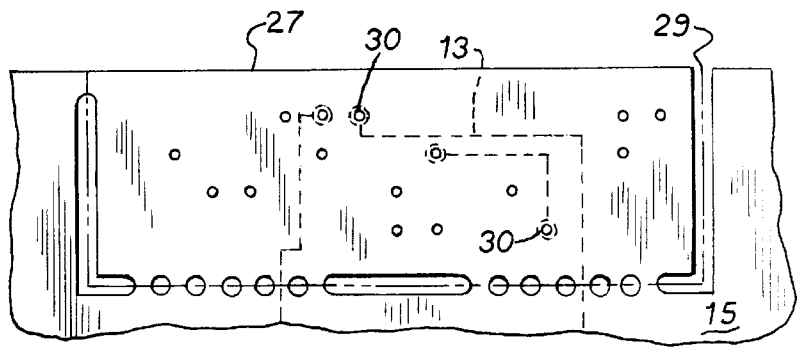

Referring to FIG. 1, the invention is incorporated in an electronic circuit board module 10 having circuit packages 11 mounted on circuit board 12. The packages 11 are interconnected by printed circuit paths known as traces 13 (seen in FIG. 3b). The circuit board 12 has a rectangular break-away section 14 forming a key and bounded by a drill pattern of slots and holes which create a series of frangible links 21 along a boundary 29 between the break-away section 14 and a main portion 15 of the circuit board 12. As seen in FIG. 3a, the drill pattern includes a first, L-shaped slot 16, a first series of holes 17, a second, straight slot 18, a second series of holes 19 and a third, L-shaped slot 20. When it is desired to remove section 14 the remaining thin, frangible portions 21 along the line 29 of the drill pattern are fractured to separate the break-away section 13.

Figure 3G:
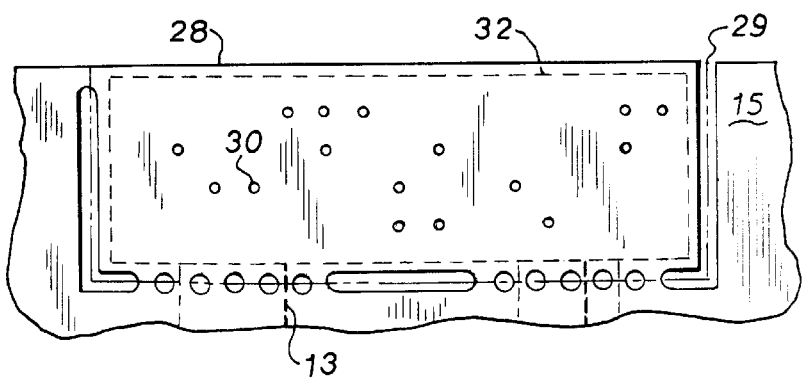

As seen in FIGS. 2, 3a–3g, circuit board 10, including the break-away portion 14, is a layered construction with eight surfaces on seven substrate layers 22–28 that carry circuit patterns or traces 13. A number of "through holes" 30 are seen in all layers, and these are used to make connections of circuit paths 13 on different layers 22–28. On the main portion 15 of circuit board 12, the center layer carries power and ground lines on opposite surfaces, but these do not extend to substrate 25 of the break-away section 14, so no circuitry is seen on substrate 25 in FIGS. 2 and 3d. The next two upper substrate layers 23–24 carry circuit paths 13 on their top surfaces. The next two lower substrate layers 26–27 carry circuit paths 13 on their bottom facing surfaces. The uppermost substrate layer 22 has a rectangular patch of metal foil 31 adhered to its top surface and lowermost substrate layer 28 has a rectangular patch of metal foil 32 adhered to its bottom surface. As seen in FIGS. 3a and 3g, the foil masks 31, 32 cover most of the area of the other layers 22–28 and prevent visibility through the circuit board 12 which would disclose the pattern and interconnections of the traces 13 disposed between the top and bottom layers 22–28. In some instances connections are made from one layer to another through the through holes 30.

As seen in FIGS. 3a–3g and 4, twelve circuit paths 13 traverse the circuit boundary. Two pairs of these circuit paths 33–34 and 36–37 are illustrated as forming a complete loop or circuit to and from the main portion 15 of the circuit board 12. One pair of circuit paths 33–34 connects to a pull-up resistor circuit 35 on the main portion 15 of circuit board 12 which will transmit a logic "1" or high signal when the break-away section 14 is intact. Another pair of circuit paths 36–37 connects to a pull-down resistor circuit 38 on the main circuit board, which will transmit a logic "0" or low signal when the break-away section 14 is intact.

Circuit paths 39–46 are illustrated as dead-ended on break-away section 14, but these circuit paths 39–46 could also be dead-ended or interrupted on the main portion 15 of the circuit board 12. Circuits 84–87 are optional pull-up and pull-down circuits, which if connected through the break-away section 14, will generate four additional logic signals on lines 40, 42, 43 and 45.

In addition to pull-up resistor circuit 35 and pull-down resistor circuit 38, lines 34, 40, 42, 43, 45 and 36 are also connected to pull-up resistor circuits 35' and 38' on the main portion 15 of circuit board 12. These pull-up circuits 35' and 38' are pulled up to a voltage V1 which is smaller than voltage V2 of pull-up circuit 35. Thus, the greater magnitude of signal generated by circuit 35 controls the level of the logic signal on line 34. Similarly, circuit 38 controls the level of logic signal on line 34. On the other hand, if circuits 35 and 38 were not connected to lines 34 and 36, the voltage from circuits 35' and 38' would pull these lines to a predetermined logic level. With logic circuits 84–87 not connected, the logic signals on lines 40, 42, 43 and 45 are controlled by pull-up circuits (not shown) on the main portion 15 of the circuit board 12, similar to the operation of circuits 35' and 38'.

Circuit paths 34, 40, 42, 43, 45 and 36 connect to inputs on logic gates 47 in programmable logic circuit 48. Logic gates 47 sense the combined logic state of signals on those lines and produce a resulting output signal (LOGIC OUT) representing the state of signals on all lines coming from the break-away section 14 of the electronic circuit board 12. The LOGIC OUT signal is transmitted from the output of logic gates 47 and is stored in a register 49 in a gate array 50. It will be apparent to those skilled in the art that logic gates 47 are not necessary and only one path 34 or 36 need be utilized to signal presence or absence of the break-away section 14. The additional lines and signals are utilized to provide more complex bit patterns and more circuit paths on the break-away section 14.

Figure 4:
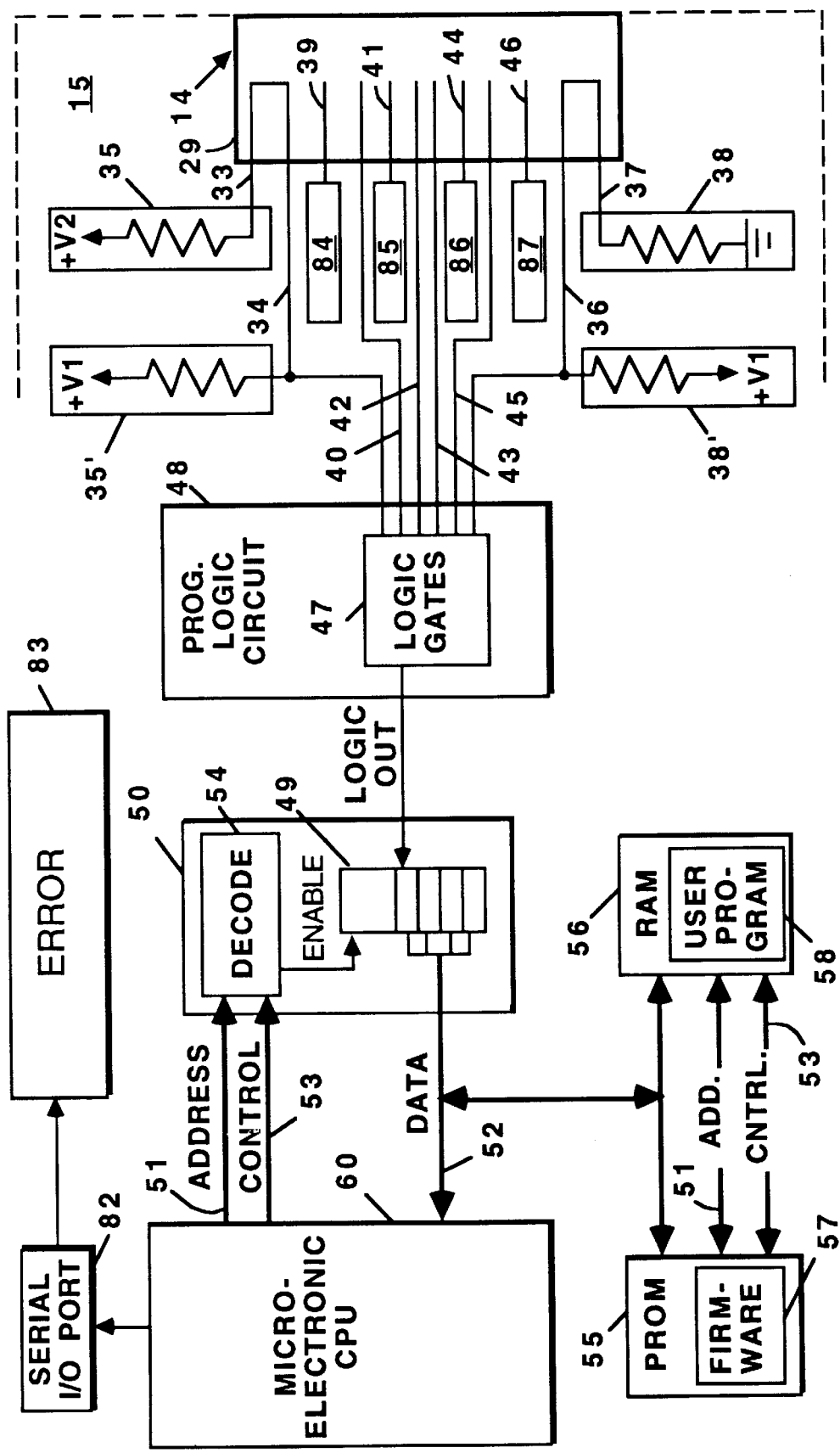
FIG. 4 is a block diagram of the circuitry on the circuit board of FIG. 1.

As further seen in FIG. 4, a microelectronic CPU 60 is connected through address bus 51, data bus 52, control bus 53, and appropriate bus buffering and address latching circuits (not shown) to decoding circuitry 54 in the gate array 50. The address and control signals are decoded by circuitry 50 to generate an enable signal to register 49 so that data can be read on data bus 52. The microelectronic CPU 60 is preferably a Motorola 68030 series CPU. The CPU 60 connects through buses 51–53 to a programmable read only memory (PROM) 55 and to a random access memory (RAM). A program of firmware instructions 56 is stored in object code in PROM 55. The RAM 56 stores data generated by program execution and also stores a user control program 58.

Figure 5:
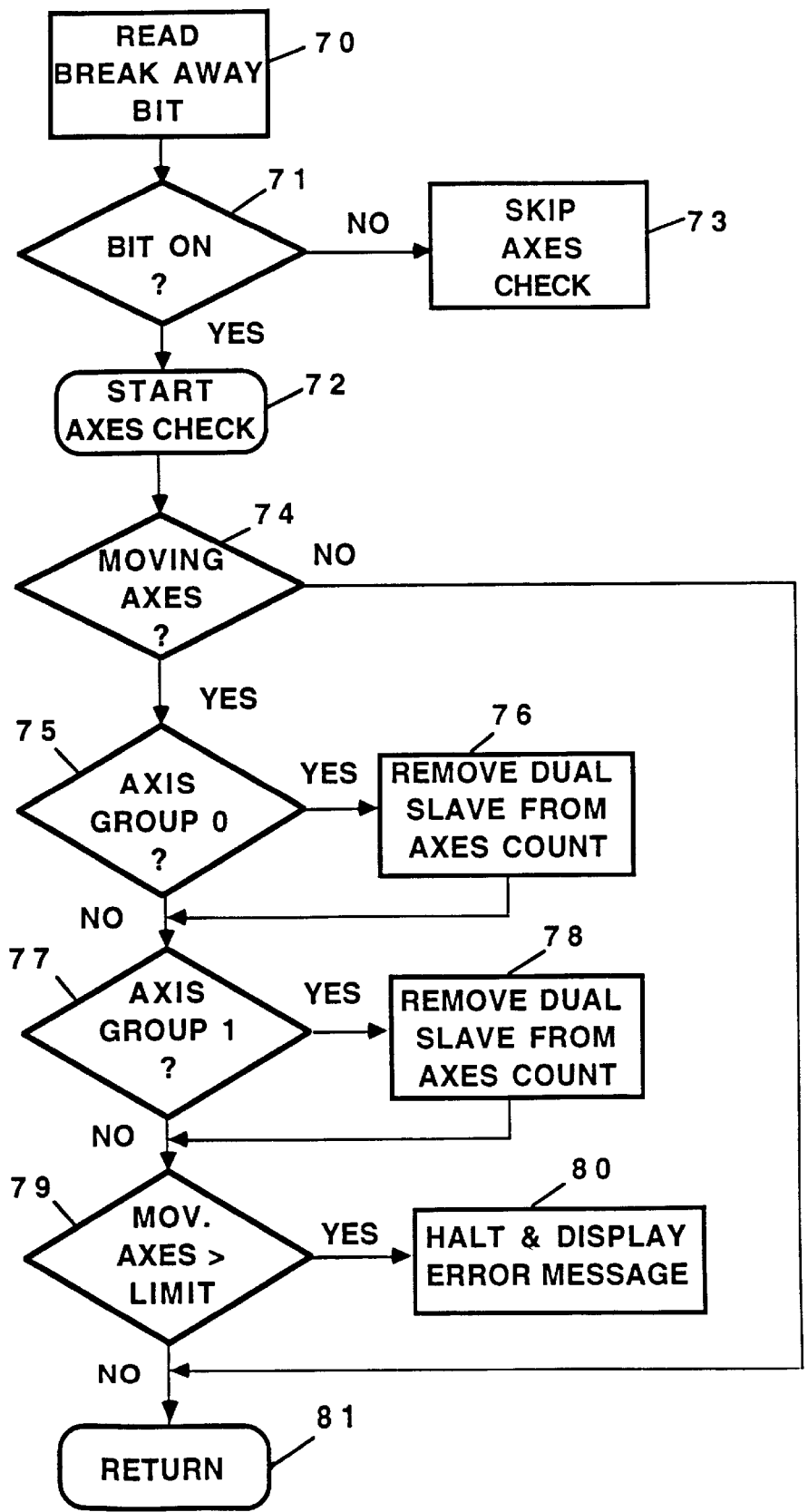
FIG. 5 is a flow chart of program instructions executed by the processor on the circuit board of FIG. 1.

The source code for certain firmware instructions 56 relevant to the invention, is included in Appendix A and illustrated in the flow chart shown in FIG. 5. As seen there, there is a routine "AXES CHECK" which starts with start block 72. Sometime prior to this routine being called, the microelectronic CPU 60 executes instructions represented by block 70 to address the register 49 and read data representing the LOGIC OUT signal and also the status of a battery. Before the CPU 60 executes a next command or move block in user program 58 in FIG. 4, it executes instructions as represented by decision block 71 to test several bits including a break-away bit which represents the logic state of the LOGIC OUT signal. If this bit is a logically true or "on", the AXES CHECK routine is executed. This signal indicates that the break-away section 14 has been removed. When this happens, the function of the CPU 60 will be limited in executing other instructions in the user control program 58.

If the break-away bit is not "on" as represented by the "NO" result from decision block 71, the processor skips the AXES CHECK routine as represented by process block 73. In the case of a "YES" result from executing decision block 71, the AXES CHECK routine will be executed next, as represented by start block 72. After detecting the break-away condition in decision block 71, a test is made to see if there are any moving axes in the next block of the user program 58, as represented by decision block 74. If motion along an axis has not been commanded or requested by the "NO" result, then the CPU 60 skips the remaining instructions in the routine and proceeds to return block 81 to end the routine.

If there are moving axes as represented by the "YES" result from decision block 74, then further instructions are executed, as represented by decision block 75, to see if a pair of axes has been grouped as Axis Group 0. If the result from this test is "YES", then dual slave axes are present and one of these must be subtracted from the total moving axes count, as represented by process block 76. After executing this procedure, or in the case when there is no Axis Group 0, the routine proceeds to check for Axis Group 1, as represented by decision block 77. If this Axis Group is present as represented by the "YES" result, then the axes count is again reduced by one to account for the dual slave axes as represented by process block 78. After this procedure has been completed, or if no "Axis Group 1" is detected in decision block 77, the CPU 60 executes further instructions, represented by decision block 79, to compare the number of commanded moving axes with an axes limit. If the number of moving axes is greater than the axes limit, as represented by the "YES" result from decision block 79, the CPU 60 will not execute the block of the user program 58 and will display an error message as represented by process block 80. The error message is displayed on a visual display 83 which may be in a piece of equipment connected to the electronic module 10 through a serial port 82 in FIG. 4.

Where the number of moving axes in the user program block is less than the limit, as signified by the "NO" result in decision block 79, the AXES CHECK routine is completed and the CPU 60 returns to complete execution of the user program block or proceeds to the next block in the user program 58.

It can be seen from this description that where the section 14 is broken away from the circuit board 12, the CPU 60 will be limited in its execution of instructions in the higher-level user program 58. Where the break-away bit is "off" in decision block 71 because the appropriate signals have been received at logic gate 47 to generate the appropriate LOGIC OUT signal, the CPU will continue to execute motion blocks in the user program 58, without an axes limitation. Such a procedure is also applicable to other types of functions besides number of axes which may be controlled by the manufacturer of the module 10 using the apparatus and method of the present invention This description has been by way of example and various details may be modified in arriving at other detailed embodiments of the invention. Therefore, to apprise the public of the scope of the invention and the embodiments covered by the invention, the following claims are made.

NOTICE

This program listing is an unpublished work in which copyright protection is claimed by Allen-Bradley Company, Inc. If publication of this work should occur, the following notice shall apply:

© 1992 Allen-Bradley Company, Inc.

```
2.0 Approach
        use the following two elements in the setup buffer. For each motion
        block, use these two axes bit patterns to count the total number of
        interpolated Axes during setup stage 2. If the total is greater than
        four (4), cycle stop with a decode error.
    struct Setup_Buff {
        .
        .
        .
        short   mvng_axis_btptrn;   /* (1) bit pattern of the moving axis */
            master dual axis ALWAYS included
            includes a dual slave axis if LINEAR move
            does not include PAL axis
        .
        .
        .
        short mvng_dual_axes(2);   /* (0s) bit pattern of moving dual axes */
            includes both master and slave axes
3.0 C Code - one routine called from setup stage 2 if the hardware signal
        indicates the COCOM tab has been broken.
    .
    .
    .
    /* If the COCOM bit is true; check for compliance */
    if (Battery_test & 0x08)
    {
        cocom_axes_check( );
    }
    .
    .
    .

/*****************************************************************/
/*   NAME:     cocom_axes_check( )                                */
/*                                                                */
/*   DESCRIPTION:   This routine checks for COCOM compliance. If the COCOM */
/*                  breakout is true, there can be a maximum of four (4)   */
/*                  concurrent interpolated Axes. Pal Axes are not included, */
/*                  and duals (one master with multiple slaves) count as one. */
/*                  A Split/Skewed pair also count as one axis.            */
/*                                                                */
/*   RETURN VALUE:  none                                          */
/*****************************************************************/
void cocom_axes_check( )
{
    short axis_mask;            /* axis bit mask                              */
    short cocom_axes;           /* count of concurrent cocom moving axes      */
    short da_slaves_mvng;       /* dual slave axes moving                     */
    short i;                    /* loop counter                               */
    short mvng_axis_btptrn;     /* bit pattern of moving axes; includes       */
                                /* dual slave axes on LINEAR moves . . .      */
    register struct Setup_Buff  *set_ptr;           /* use register for speed */
    /*************************************************************
    *   copy Stg2_intrf_ptr to register; get total bit pattern of mvng axes
    *************************************************************/
    set_ptr = Stg2_intrf_ptr;
    mvng_axis_btptrn = ste_ptr->mvng_axis_btptrn;
    /*************************************************************
    *   only do the COCOM checks if a motion block. Note that mvng_axis_btptrn
    *   does NOT contain Split/Skewed slave Axes, Pal Axes, or dual non-linear
    *   slaves.
    *************************************************************/
```

```
if (mvng_axis_ptptrn)
{
/************************************************************
 *   check for moving dual group one; remove dual slave axes from axis bits
 ************************************************************/
    if (set_ptr->mvng_dual axes[0])
    {
      da_slaves_mvng = set_ptr->mvng_dual_axes[0] &
                    ~FGDATA_ptr->da_current1_master;
      mvng_axis_btptrn &= ~da_slaves_mvng;
    }
/************************************************************
 *   check for moving dual group two; remove dual slave axes from axis bits
 ************************************************************/
    if (set_ptr->mvng_dual_axes[1])
    {
      da_slaves_mvng = set_ptr->mvng_dual_axes[1]&
                    ~FGDATA_ptr->da_current2_master;
      mvng_axis_btptrn &= ~da_slaves_mvng;
    }
/************************************************************
 *   count the number of moving axes. If more than allowed by COCOM - (4)
 *   force a decode error.
 ************************************************************/
    cocom_axes = 0;
    for (i = 0, axis_mask = 1; i < set_ptr->num_rv_axes; i++, axis_mask <<=1)
    }
      if (mvng_axis_btptrn & axis_mask)
      {
        cocom_axes++;
      }
    {
    if (cocom_axes > 4)
    }
      intrf_2_error(DE_COCOM_AXES_EXCEEDED);
    }
  }
}
```

We claim:

1. An electronic module with a tamper-resistant key for reconfiguring an operation of a electronic module, the module comprising:

a multiple layer circuit board having at least three layers and having a main portion and a break-away portion forming the key;

a processor on the main portion;

a plurality of circuit paths traversing a boundary between the main portion and the break-away portion on a plurality of the at least three layers of the circuit board wherein at least one circuit path of the plurality of circuit paths traversing the boundary is located on an intermediate circuit board layer of the at least three layers, the circuit paths traversing the boundary being broken when the break-away portion is removed from the main portion;

wherein the circuit paths carry an identification signal from the break-away portion to the main portion so that the signal may be read by the processor;

wherein the processor executes instructions for carrying out user-programmed functions;

wherein the processor executes instructions to read data representing the identification signal;

wherein the processor executes instructions that are responsive to the identification signal being absent when the break-away portion has been removed from the main portion to thereby prevent execution of at least one instruction for carrying out the user-programmed functions;

a plurality of foil masks adhered to the top and bottom of the break-away portion to prevent observation of the circuit paths on the break-away portion;

wherein at least one circuit path is dead-ended on the break-away portion and is not connected to any circuit elements on the break-away portion of the circuit board; and wherein the circuit board includes the top and bottom layers and at least one circuit path is interconnected between different layers on the break-away portion that are not the top and bottom layers.

* * * * *